(12) United States Patent
Huang (10) Patent No.: US 11,870,481 B1
(45) Date of Patent: Jan. 9, 2024

(54) FULL-BODY PROTECTIVE PHONE CASE FOR FULLY PROTECTED FOLDABLE SCREEN

(71) Applicant: Qi Huang, Shenzhen (CN)

(72) Inventor: Qi Huang, Shenzhen (CN)

( * ) Notice: Subject to any disclaimer, the term of this patent is extended or adjusted under 35 U.S.C. 154(b) by 0 days.

(21) Appl. No.: 18/454,511

(22) Filed: Aug. 23, 2023

(30) Foreign Application Priority Data

Aug. 14, 2023 (CN) .......................... 202322172086.3

(51) Int. Cl.
*H04B 1/38* (2015.01)
*H04B 1/3888* (2015.01)

(52) U.S. Cl.
CPC .................................. *H04B 1/3888* (2013.01)

(58) Field of Classification Search
CPC .......... H04B 1/3888; H04B 2001/3894; G06F 1/1641; G06F 1/166; G06F 1/1677; G06F 1/1652; G09F 9/301; H04M 1/0268
See application file for complete search history.

(56) References Cited

U.S. PATENT DOCUMENTS

| 2014/0368996 A1* | 12/2014 | Tsao ...................... | G06F 1/1681 |
| | | | 361/679.55 |
| 2016/0187928 A1* | 6/2016 | Zeng ..................... | G06F 1/1677 |
| | | | 361/679.02 |
| 2019/0011954 A1* | 1/2019 | Chu ........................ | B32B 17/10 |
| 2023/0347834 A1* | 11/2023 | Li .......................... | A45C 11/00 |

* cited by examiner

*Primary Examiner* — Fred A Casca
(74) *Attorney, Agent, or Firm* — Daniel M. Cohn; Howard M. Cohn (57) ABSTRACT

The present disclosure provides a full-body protection phone case for a fully protected foldable screen, comprising: a lower backboard, an upper cover plate and hinge protector assembly; the hinge protector assembly is installed on one side of the lower backboard and the upper cover plate; the hinge protector assembly comprises a hinge protection frame, fixed supports, movably threading needle pieces, connecting plates and threaded holes; the fixed supports are fixed on both sides of the hinge protection frame close to the lower backpboard and the upper cover plate; the movably threading needle pieces run through the interior of the fixed supports; the two ends of the movably threading needle pieces are rotatably connected with the connecting plates, and the side of the connecting plate is equipped with the threaded holes, the inner side of the upper cover plate is equipped with a front screen protection frame.

7 Claims, 6 Drawing Sheets

FULL-BODY PROTECTIVE PHONE CASE FOR FULLY PROTECTED FOLDABLE SCREEN

TECHNICAL FIELD

The present disclosure relates to a technical field of a mobile phone case, and in particular to a full-body protective phone case for fully protected foldable screen.

BACKGROUND

Folding phones are a form of smartphone design, and the flexible AMOLED screen is a key breakthrough for folding phones. With the rapid development of science and technology, the science and technology beauty industry has been born as a new industry. A phone case is an accessory that protects or decorates the appearance of a phone. The phone protective case not only used as decorations to make phones beautiful, but also protects the phone from falling, scratching, waterproofing and shock.

Since the folding screen phone realizes the two structures of the inner screen and the outer screen by opening and closing, it needs to have a hinge connection. Most of the phone cases on the market now can only protect the front screen and the back cover, so the hinge structure of the phone is easy to wear.

Therefore, in view of this, research and improvement were conducted on the existing structure and deficiencies, and a full-body protective phone case for fully protected foldable screen was proposed.

SUMMARY

The present disclosure provides a full-body protective phone case for fully protected foldable screen, in order to solve the problems raised in the background mentioned above.

The working process of the full-body protective phone case for fully protected foldable screen of the present application is as follows: the full-body protective phone case for fully protected foldable screen, comprising: a lower backboard, an upper cover plate and hinge protector assembly; the upper cover plate is installed on the upper side of the lower backboard, and the hinge protector assembly is installed on one side of the lower backboard and the upper cover plate; the hinge protector assembly comprises a hinge protection frame, fixed supports, movably threading needle pieces, a connecting plate and threaded holes; the fixed supports are fixed on both sides of the hinge protection frame close to the lower backpboard and the upper cover plate; the movably threading needle pieces run through the interior of the fixed supports; the two ends of the movably threading needle pieces are rotatably connected with the connecting plates, and the side of the connecting plate is equipped with the threaded holes, the inner side of the upper cover plate is equipped with a front screen protection frame, the surface of the front screen protection frame is installed with a tempered film, and there is an adhesive strip connected to the side of the tempered film near the front screen protection frame; the upper and lower sides of the upper cover plate are fixed with non-slip rubber layers on the left and right sides, the middle and lower part of the outer wall of the lower backboard is arranged with a rotating support through a rotating shaft, and the rotating support is a hollow structure.

Furthermore, screws are penetrated through the threaded holes of the connecting plates, and the connecting plates are bolted to the lower backboard and the upper cover plate.

Furthermore, the hinge protector assembly also comprises an adsorption slot; and the edge of the hinge protection frame and the edge of the front screen protection frame are provided with the adsorption slots; and the interior of the adsorption slot is filled with adsorption materials.

Furthermore, the outer side of the hinge protection frame is provided with a pen sleeve assembly, which comprises a detachable pen sleeve, a limiting hole, a positioning hole column, a small pen sleeve, and a clamping block; the outer wall of the hinge protection frame is provided with the limiting hole, and the positioning hole column is fixed on one side of the detachable pen sleeve near the limiting hole; the small pen sleeve is snap-fitted inside the detachable pen sleeve, and the clamping block are fixed on both sides of the small pen sleeve.

Furthermore, the upper side of the lower backboard is provided with a protective sliding window assembly; and the protective window sliding assembly comprises a camera reserved port, a track, a sliding window cover, and a first adsorption material; one side of the camera reserved port is provided with the track, the sliding window cover is installed on the outside of the track, and the first adsorption material is provided on both sides of the inside of the track.

Furthermore, the inner hollow part of the rotating support is provided with a second adsorption material, and the second adsorption material is fixedly connected with the lower backboard.

Furthermore, the outer wall side of the lower backboard is fixed with a baffle plate; both sides of the outer wall of the lower backboard are provided with non-slip stripes.

The present disclosure has beneficial effects as follows.

Compared with the existing technology, the present disclosure comprises the hinge protector assembly. The fixed supports of the hinge protection frame are coupled with the lower backboard and upper cover plate through movably threading needle piece, enabling the hinge protector assembly to be opened or closed. The design of the baffle plate when the hinge protector assembly opens can prevent the hinge from opening more than 90°, preventing excessive opening. The adsorption magnetic block inside the adsorption slot enables the hinge protector assembly to attach to the hinge of the phone itself when closed. The screws are threaded through the threaded holes of the connecting plates so that the connecting plates are bolted to the lower backboard and the upper cover plate, which facilitates the removal of the hinge protection frame. The lower backboard and the upper cover plate are located outside the folding screen phone; the hinge protector assembly is located on the outside of the hinge of the phone to protect the hinge, and then form a full-body protective structure.

The present disclosure also comprises the lower backboard and upper cover plate, there is an adhesive strip connected to the side of the tempered film near the front screen protection frame, which can prevent the front screen protective frame from popping out. The setting of the front screen protection frame makes it have better anti-fall performance. The non-slip rubber layers designed in the upper, lower, left, and right areas of the upper cover plate can increase the friction between the protective case and the phone, making the upper cover plate more fitting and stable to be installed on the front screen of the phone. The rotating support can rotate 180° for users to support the phone from multiple angles, and can also be used as a finger ring. The second adsorption material can make the phone adhere to a bracket or other object with a magnet, and the non-slip stripes can increase the friction between the hand and the phone case, allowing users to better grip the phone and prevent it from slipping and falling.

The present disclosure further comprises the pen sleeve assembly and the protective sliding window assembly, the limiting hole of the hinge protection frame can slide and clamp the positioning hole column of the detachable pen sleeve in the form of a clip, thereby making the detachable pen sleeve easy to disassemble. The setting of detachable pen sleeve is convenient for users to carry and store the stylus. The setting of the clamping block facilitates the installation of the small pen sleeve. After the small pen sleeve is assembled, the internal volume of the detachable pen sleeve is reduced, which facilitates the placement of the small-sized stylus. The detachable pen sleeve and the small pen sleeve can be used for different sizes of stylus, making them more flexible to use. The sliding window cover can protect the camera from being broken and cover it to prevent the phone from taking photos. The sliding design of the track and sliding window cover allows users to easily open or close the sliding window cover. The first adsorption material at a specific position on the track and the built-in magnet of the sliding window cover form a magnetic absorption structure, which allows the sliding window cover to be adsorbed and fixed by the first adsorption material when sliding left and right. This solves the problem of ordinary sliding windows being fixed by plastic clamping points for a long time, which may wear out and may not be stuck.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

Reference number in the drawings:

| | | | |
|---|---|---|---|
| lower backboard | 1 | upper cover plate | 2 |
| hinge protector assembly | 3 | hinge protection frame | 301 |
| fixed support | 302 | movably threading needle piece | 303 |
| connecting plate | 304 | threaded hole | 305 |
| adsorption slot | 306 | pen sleeve assembly | 4 |
| detachable pen sleeve | 401 | limiting hole | 402 |
| positioning hole column | 403 | small pen sleeve | 404 |
| clamping block | 405 | front screen protection frame | 5 |
| tempered film | 6 | non-slip rubber layers | 7 |
| protective sliding window assembly | 8 | camera reserved port | 801 |
| track | 802 | sliding window cover | 803 |
| first adsorption material | 804 | rotating shaft | 9 |
| rotating support | 10 | second adsorption material | 11 |
| baffle plate | 12 | non-slip stripes | 13 |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

Referring to FIG. 1 to FIG. 5 and FIG. 9, the embodiment of the present disclosure provides a full-body protection phone case for a fully protected foldable screen, comprising: a lower backboard 1, an upper cover plate 2 and hinge protector assembly 3; the upper cover plate 2 is installed on the upper side of the lower backboard 1, and the hinge protector assembly 3 is installed on one side of the lower backboard 1 and the upper cover plate 2; the hinge protector assembly 3 comprises a hinge protection frame 301, fixed supports 302, movably threading needle pieces 303, connecting plates 304 and threaded holes 305; the hinge protecting frame 301 is fixed with the fixed supports 302 close to the two sides of the lower backboard 1 and the upper cover plate 2; the movably threading needle pieces 303 run through the interior of the fixed supports 302; the two ends of the movably threading needle pieces 303 are rotatably connected with the connecting plates 304, and the side of the connecting plate 304 is equipped with the threaded holes 305, screws are penetrated through the threaded holes 305 of the connecting plates 304, and the connecting plates 304 are bolted to the lower backboard 1 and the upper cover plate 2. The hinge protector assembly 3 also comprises an adsorption slot 306; and the edge of the hinge protection frame 301 and the edge of the front screen protection frame 5 are provided with adsorption slots 306; and the interior of the adsorption slot 306 is filled with adsorption materials.

In this embodiment, the fixed supports of the hinge protection frame 301 are coupled with the lower backboard 1 and the upper cover plate 2 through movably threading needle pieces 303, enabling the hinge protector assembly 3 to be opened or closed. The design of the baffle plate 12 when the hinge protector assembly 3 opens can prevent the hinge from opening more than 90°, preventing excessive opening. The adsorption magnetic block inside the adsorption slot 306 enables the hinge protector assembly 3 to attach to the hinge of the phone itself when closed. The screws are threaded through the threaded holes 305 of the connecting plates 304 so that the connecting plates 304 are bolted to the lower backboard 1 and the upper cover plate 2, which facilitates the removal of the hinge protection frame 301. The lower backboard 1 and the upper cover plate 2 are located outside the folding screen phone; the hinge protector assembly 3 is located on the outside of the hinge of the phone to protect the hinge, and then form a full-body protective structure.

Referring to FIG. 1, FIG. 6, FIG. 7 and FIG. 10 to FIG. 12, the outer side of the hinge protection frame 301 is provided with a pen sleeve assembly 4, which comprises a detachable pen sleeve 401, a limiting hole 402, a positioning hole column 403, a small pen sleeve 404 and a clamping block 405; the outer wall of the hinge protection frame 301 is provided with the limiting hole 402, and the positioning hole column 403 is fixed on one side of the detachable pen sleeve 401 near the limiting hole 402; the small pen sleeve 404 is snap-fitted inside the detachable pen sleeve 401, and the clamping block 405 are fixed on both sides of the small pen sleeve 404. In this embodiment, the limiting hole 402 of the hinge protection frame 301 can slide and clamp the positioning hole column 403 of the detachable pen sleeve 401 in the form of a clip, thereby making the detachable pen sleeve 401 easy to disassemble. The setting of detachable pen sleeve 401 is convenient for users to carry and store the stylus. The setting of the clamping block 405 facilitates the installation of the small pen sleeve 404. After the small pen sleeve 404 is assembled, the internal volume of the detachable pen sleeve 401 is reduced, which facilitates the placement of the small-sized stylus. The detachable pen sleeve 401 and the small pen sleeve 404 can be used for different sizes of stylus, making them more flexible to use.

Figure 1:
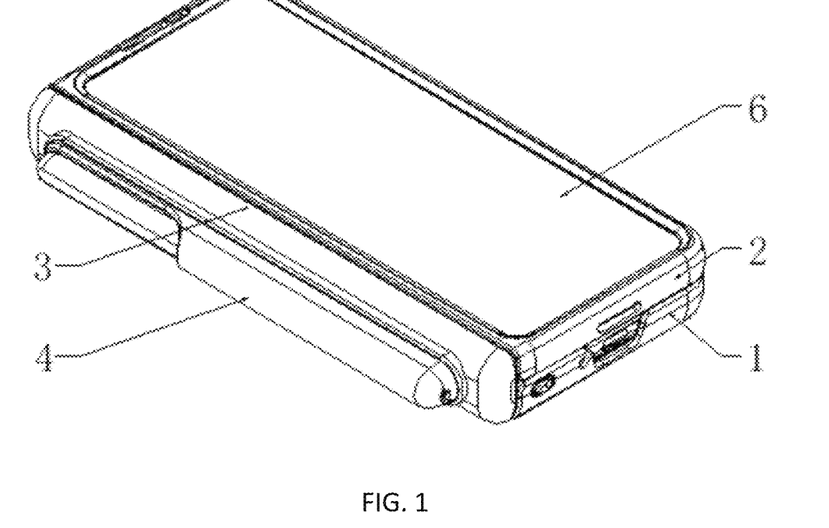
FIG. 1 is a perspective view of a full-body protection phone case for a fully protected foldable screen.
Figure 2:
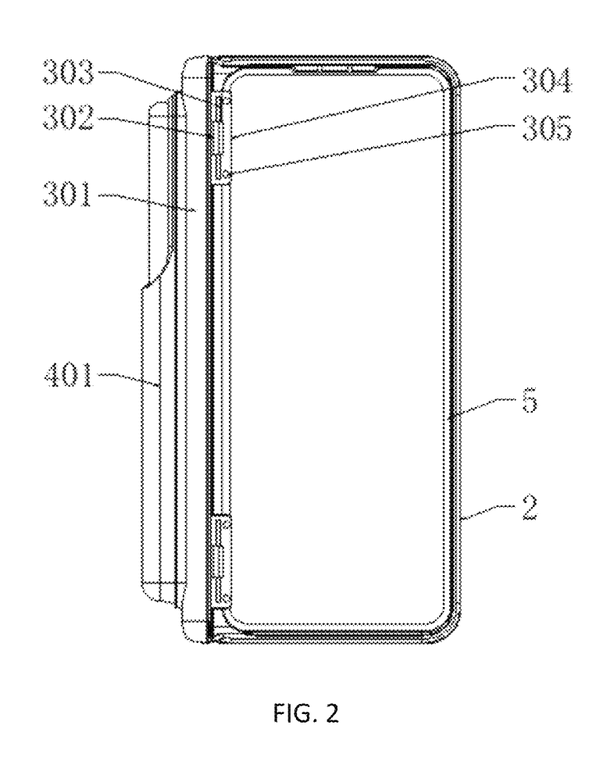
FIG. 2 is a bottom plan view of the present disclosure.
Figure 3:
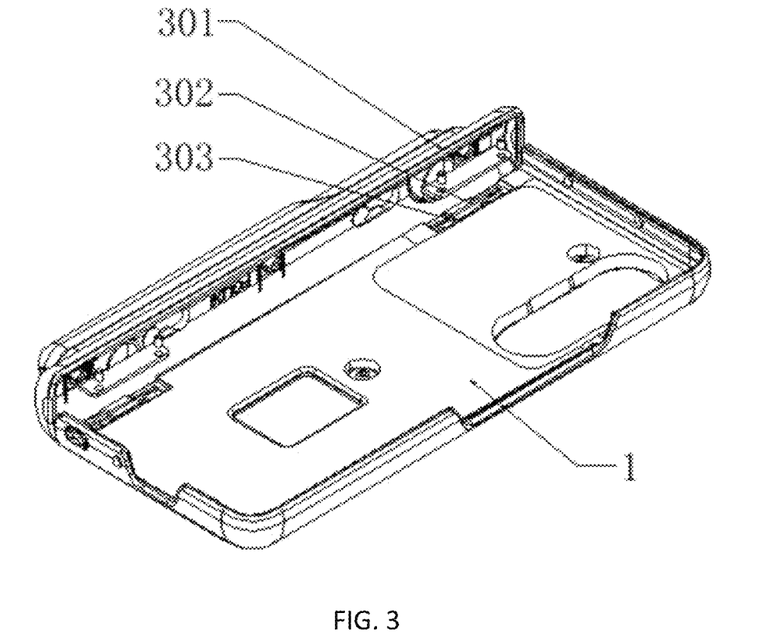
FIG. 3 is a structure view of the lower backboard of the present disclosure.
Figure 4:
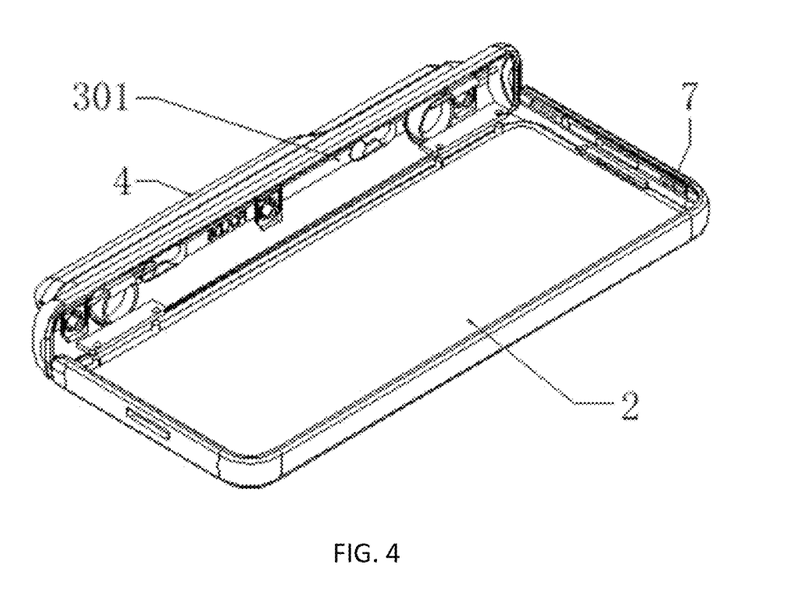
FIG. 4 is a structure view of the upper cover plate of the present disclosure.
Figure 5:
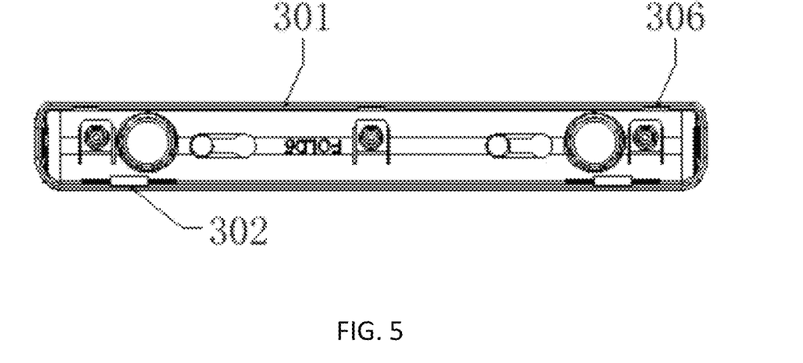
FIG. 5 is an inner structure view of the hinge protection frame of the present disclosure.
Figure 6:
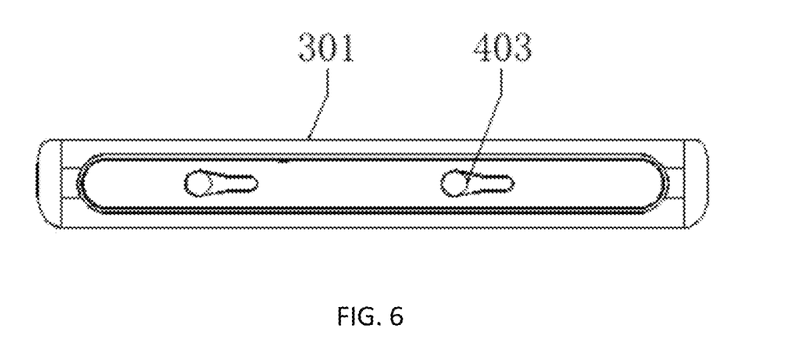
FIG. 6 is an outer structure view of the hinge protection frame of the present disclosure.
Figure 7:
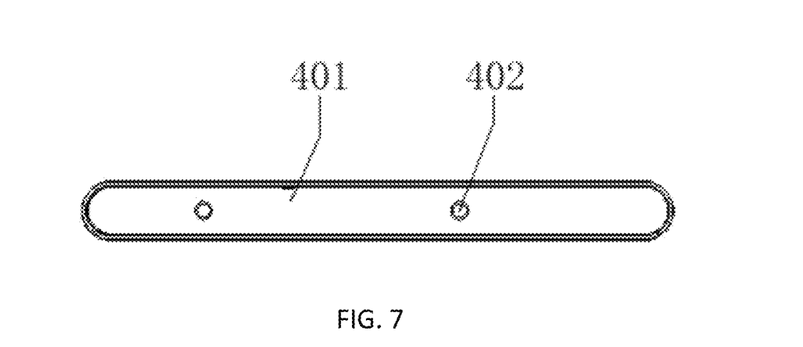
FIG. 7 is a structure view of the detachable pen sleeve and the positioning hole column of the present disclosure.
Figure 8:
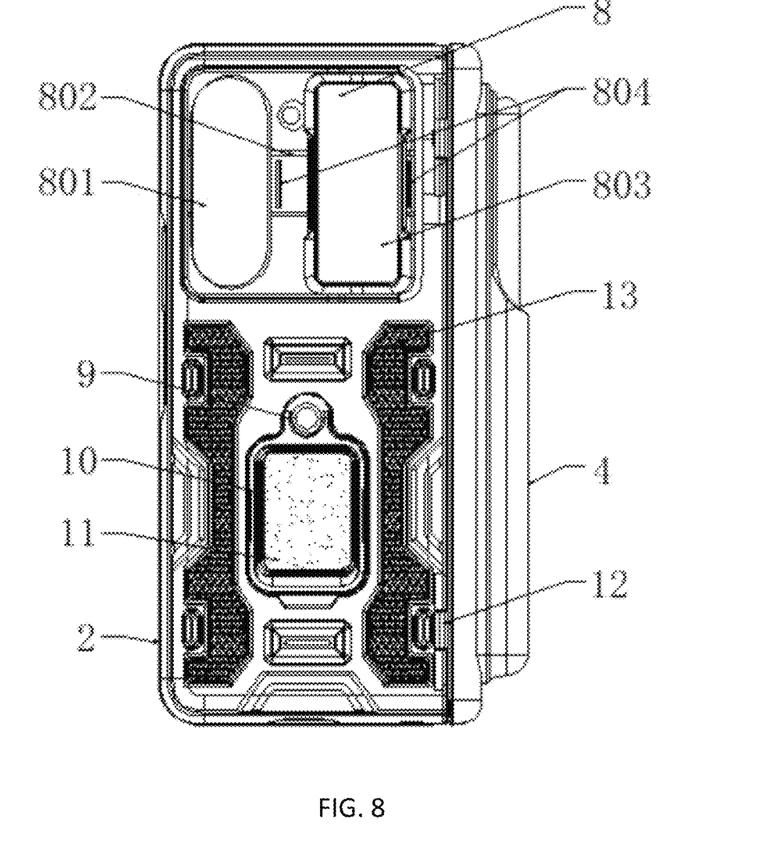
FIG. 8 is a top plan view of the present disclosure.
Figure 9:
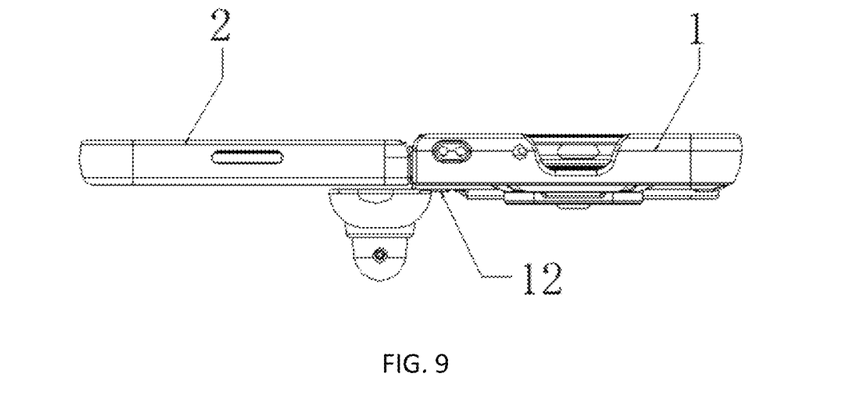
FIG. 9 is an exploded front elevational view of the present disclosure.
Figure 10:
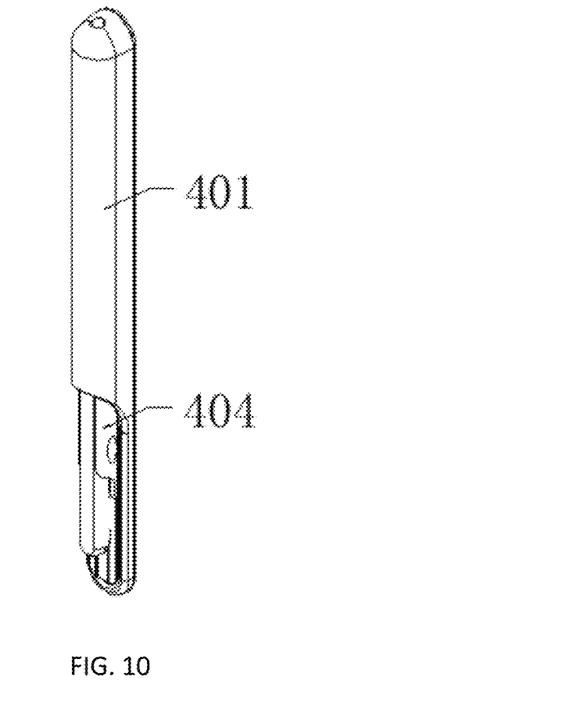
FIG. 10 is a structure view of the detachable pen sleeve of the present disclosure.
Figure 11:
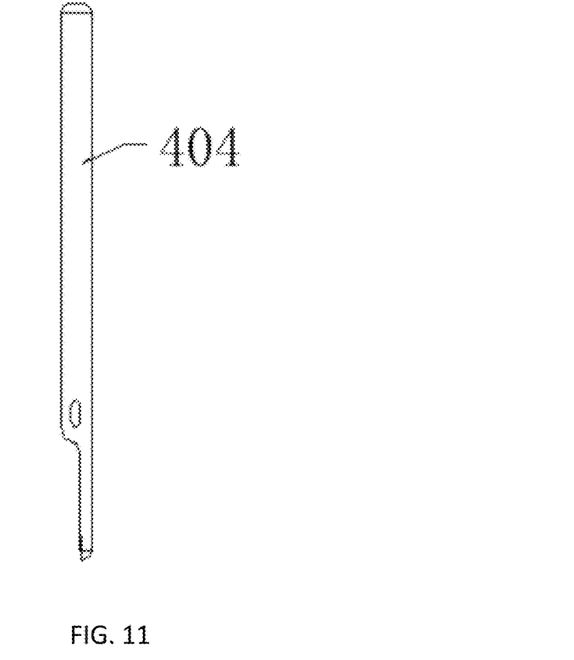
FIG. 11 is a side view of the small pen sleeve of the present disclosure.
Figure 12:
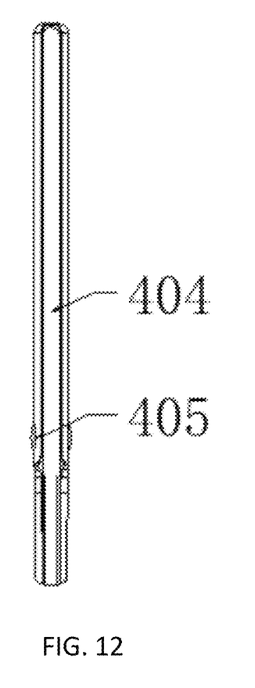
FIG. 12 is a front elevational view of the small pen sleeve of the present disclosure.

Referring to FIG. 8, the upper side of the lower backboard 1 is provided with a protective sliding window assembly 8; and the protective window sliding assembly 8 comprises a camera reserved port 801, a track 802, a sliding window cover 803 and a first adsorption material 804; one side of the camera reserved port 801 is provided with the track 802, the sliding window cover 803 is installed on the outside of the track 802, and the first adsorption material 804 is provided on both sides of the inside of the track 802.

In this embodiment, the sliding window cover 803 can protect the camera from being broken and cover it to prevent the phone from taking photos. The sliding design of the track 802 and sliding window cover 803 allows users to easily open or close the sliding window cover 803. The first adsorption material 804 at a specific position on the track and the built-in magnet of the sliding window cover 803 form a magnetic absorption structure, which allows the sliding window cover 803 to be adsorbed and fixed by the first adsorption material 804 when sliding left and right. This solves the problem of ordinary sliding windows being fixed by plastic clamping points for a long time, which may wear out and may not be stuck.

Referring to FIG. 1, FIG. 2, FIG. 8 and FIG. 9, the inner side of the upper cover plate 2 is equipped with the front screen protection frame 5, the surface of the front screen protection frame 5 is installed with a tempered film 6, and there is an adhesive strip connected to the side of the tempered film 6 near the front screen protection frame 5; the upper and lower sides of the upper cover plate 2 are fixed with non-slip rubber layers 7 on the left and right sides, the middle and lower part of the outer wall of the lower backboard 1 is arranged with a rotating support 10 through a rotating shaft 9, and the rotating support 10 is a hollow structure. The inner hollow part of the rotating support 10 is provided with a second adsorption material 11, and the second adsorption material 11 is fixedly connected with the lower backboard 1. The outer wall side of the lower backboard 1 is fixed with a baffle plate 12; both sides of the outer wall of the lower backboard 1 are provided with non-slip stripes 13.

In this embodiment, the adhesive strip connects to the side of the tempered film 6 near the front screen protection frame 5, which can prevent the front screen protective frame 5 from popping out. The setting of the front screen protection frame 5 makes it have better non-fall performance. The non-slip rubber layers 7 designed in the upper, lower, left and right areas of the upper cover plate 2 can increase the friction between the protective case and the phone, making the upper cover plate 2 more fitting and stable to be installed on the front screen of the phone. The rotating support 10 can rotate 360° for users to support the phone from multiple angles, and can also be used as a finger ring. The second adsorption material 11 can make the phone adhere to a bracket or other object with a magnet, and the non-slip stripes 13 can increase the friction between the hand and the phone case, allowing users to better grip the phone and prevent it from slipping and falling.

To summarize, referring to FIG. 1 to FIG. 9, When uses the full-body protection phone case for a fully protected foldable screen, firstly, the lower backboard 1, the upper cover plate 2 and the hinge protector assembly 3 can be assembled; then place the foldable screen phone and install tempered film 6. The non-slip rubber layers 7 designed in the upper, lower, left and right areas of the upper cover plate 2 can increase the friction between the protective case and the phone, making the upper cover plate 2 more fitting and stable to be installed on the front screen of the phone. The adhesive strip connects to the side of the tempered film 6 near the front screen protection frame 5, which can prevent the front screen protective frame 5 from popping out. The lower backboard 1 and the upper cover plate 2 are located outside the folding screen phone; the hinge protector assembly 3 is located on the outside of the hinge of the phone to protect the hinge, and then form a full-body protective structure.

The foldable screen of the phone can be unfolded during use, the design of the baffle plate 12 when the hinge protector assembly 3 opens can prevent the hinge from opening more than 90°, preventing excessive opening. On the contrary, the adsorption magnetic block inside the adsorption slot 306 enables the hinge protector assembly 3 to attach to the hinge of the phone itself when closed. The rotating support 10 can rotate 360° for users to support the phone from multiple angles, and can also be used as a finger ring. The second adsorption material 11 can make the phone adhere to a bracket or other object with a magnet, and the non-slip stripes 13 can increase the friction between the hand and the phone case, allowing users to better grip the phone and prevent it from slipping and falling.

Users can also install the pen sleeve assembly 4 as needed. During installation, the limiting hole 402 of the hinge protection frame 301 can slide and clamp the positioning hole column 403 of the detachable pen sleeve 401 in the form of a clip, thereby making the detachable pen sleeve 401 easy to disassemble. The setting of detachable pen sleeve 401 is convenient for users to carry and store the stylus. And the small pen sleeve 404 can be selected and assembled according to different sizes of stylus, which enables the small pen sleeve 404 to clamp and fix some upgraded stylus. It is suitable for different sizes of stylus and prevents the upgraded thinner stylus from shaking and falling out after being directly loaded into the detachable pen sleeve 401. When using a phone camera, the sliding design of the track 802 and sliding window cover 803 allows users to easily open or close the sliding window cover 803. The first adsorption material 804 at a specific position on the track and the built-in magnet of the sliding window cover 803 form a magnetic absorption structure, which allows the sliding window cover 803 to be adsorbed and fixed by the first adsorption material 804 when sliding left and right. This solves the problem of ordinary sliding windows being fixed by plastic clamping points for a long time, which may wear out and may not be stuck. This completes the process of using the full-body protective phone case for fully protected foldable screen.

Above are only preferred embodiments of the present disclosure and are not intended to limit the present disclosure. Any modification, equivalent replacement and improvement made within spirit and principle of the present disclosure should be included in protection scope of the present disclosure.

What is claimed is:

1. A full-body protective phone case for fully protected foldable screen, comprising:
   a lower backboard, an upper cover plate and hinge protector assembly;
   the upper cover plate is installed on the upper side of the lower backboard, and the hinge protector assembly is installed on one side of the lower backboard and the upper cover plate; the hinge protector assembly comprises a hinge protection frame, fixed supports, movably threading needle pieces, connecting plates and threaded holes; the fixed supports are fixed on both sides of the hinge protection frame close to the lower backpboard and the upper cover plate; the movably threading needle pieces run through the interior of the fixed supports; the two ends of the movably threading needle pieces are rotatably connected with the connecting plates, and the side of the connecting plate is equipped with the threaded holes, the inner side of the upper cover plate is equipped with a front screen protection frame, the surface of the front screen protection frame is installed with a tempered film, and there is an adhesive strip connected to the side of the tempered film near the front screen protection frame; the upper and lower sides of the upper cover plate are fixed with non-slip rubber layers on the left and right sides, the middle and lower part of the outer wall of the lower backboard is arranged with a rotating support through a rotating shaft, and the rotating support is a hollow structure.

2. The full-body protective phone case for fully protected foldable screen of claim 1, wherein screws are penetrated through the threaded holes of the connecting plates, and the connecting plate is bolted to the lower backboard and the upper cover plate.

3. The full-body protective phone case for fully protected foldable screen of claim 2, wherein the hinge protector assembly also comprises an adsorption slot; and the edge of the hinge protection frame and the edge of the front screen protection frame are provided with the adsorption slots; and the interior of the adsorption slot is filled with adsorption materials.

4. The full-body protective phone case for fully protected foldable screen of claim 1, wherein the outer side of the hinge protection frame is provided with a pen sleeve assembly, which comprises a detachable pen sleeve, a limiting hole, a positioning hole column, a small pen sleeve, and a clamping block; the outer wall of the hinge protection frame is provided with the limiting hole, and the positioning hole column is fixed on one side of the detachable pen sleeve near the limiting hole; the small pen sleeve is snap-fitted inside the detachable pen sleeve, and the clamping block are fixed on both sides of the small pen sleeve.

5. The full-body protective phone case for fully protected foldable screen of claim 1, wherein the upper side of the lower backboard is provided with a protective sliding window assembly; and the protective window sliding assembly comprises a camera reserved port, a track, a sliding window cover and a first adsorption material; one side of the camera reserved port is provided with the track, the sliding window cover is installed on the outside of the track, and the first adsorption material is provided on both sides of the inside of the track.

6. The full-body protective phone case for fully protected foldable screen of claim 1, wherein the inner hollow part of the rotating support is provided with a second adsorption material, and the second adsorption material is fixedly connected with the lower backboard.

7. The full-body protective phone case for fully protected foldable screen of claim 1, wherein the outer wall side of the lower backboard is fixed with a baffle plate; both sides of the outer wall of the lower backboard are provided with non-slip stripes.

* * * * *